United States Patent

Rawls

[15] 3,686,391
[45] Aug. 22, 1972

[54] METHOD OF CENTERING TIRE CARCASS IN MOLD

[72] Inventor: Vaughn Rawls, Lima, Ohio

[73] Assignee: National-Standard Company, Niles, Mich.

[22] Filed: Oct. 12, 1970

[21] Appl. No.: 79,917

Related U.S. Application Data

[62] Division of Ser. No. 702,224, Feb. 1, 1968, Pat. No. 3,590,433.

[52] U.S. Cl. .................................264/315, 264/36
[51] Int. Cl. .................................B29h 5/04
[58] Field of Search.264/315, 326, 36; 18/279, 17 K, 18/17 W, 17 T, 18 F; 425/19, 23, 25, 36, 58

[56] References Cited

UNITED STATES PATENTS 3,418,400   12/1968   Clapp .........................264/36

FOREIGN PATENTS OR APPLICATIONS 941,020   11/1963   Great Britain..............18/18 F

*Primary Examiner*—Robert F. White
*Assistant Examiner*—J. H. Silbaugh
*Attorney*—Johnson, Dienner, Emrich, Verbeck & Wagner

[57] ABSTRACT

Method of centering a tire carcass in a tire vulcanizing mold including the steps of inflating the air bag contained in the tire carcass prior to lowering the carcass into the mold and thereafter moving opposed tire beads conjointly and uniformly relative to each other to cause the tire beads and tire carcass to be in centered relation with respect to the mold.

3 Claims, 8 Drawing Figures

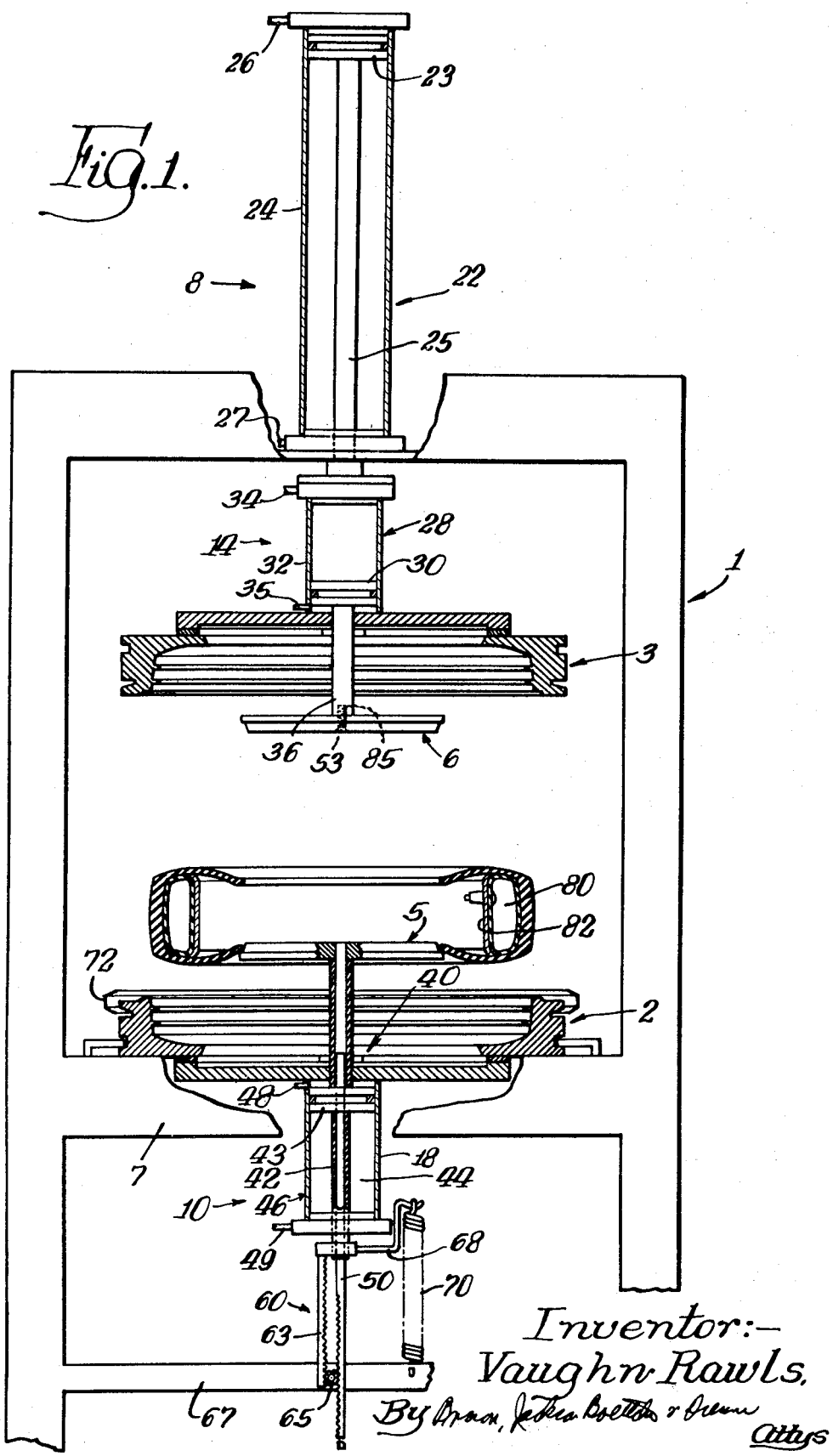

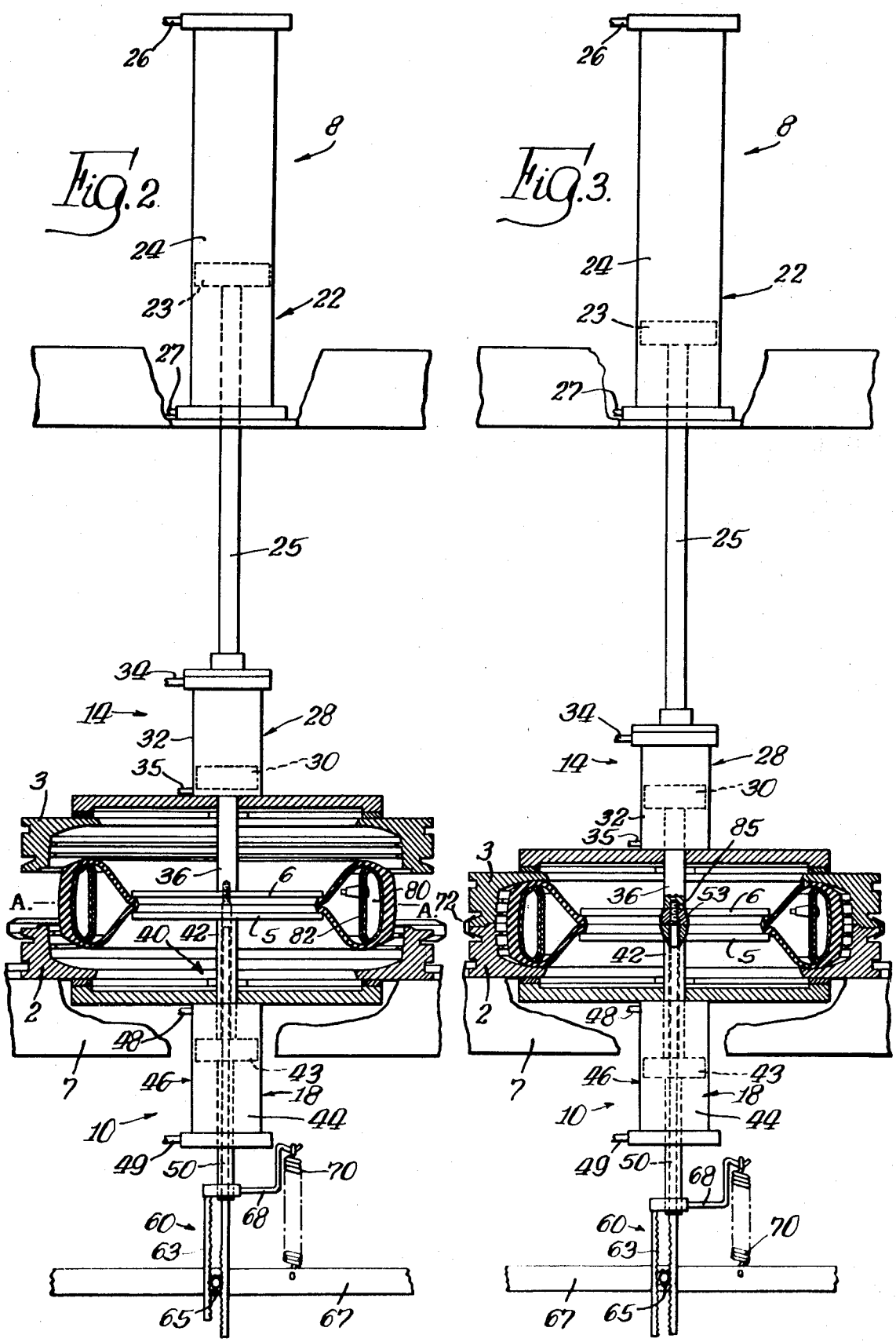

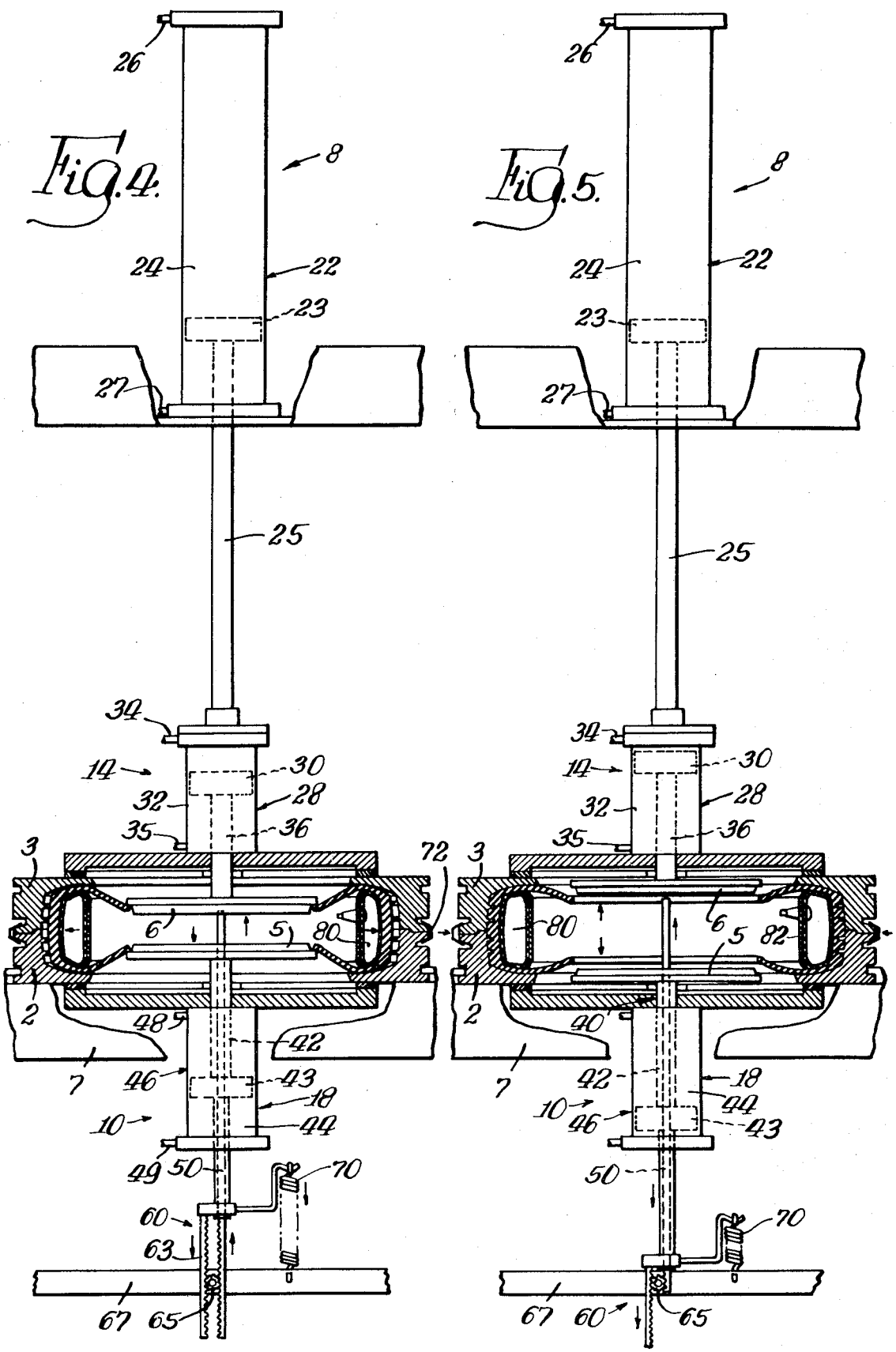

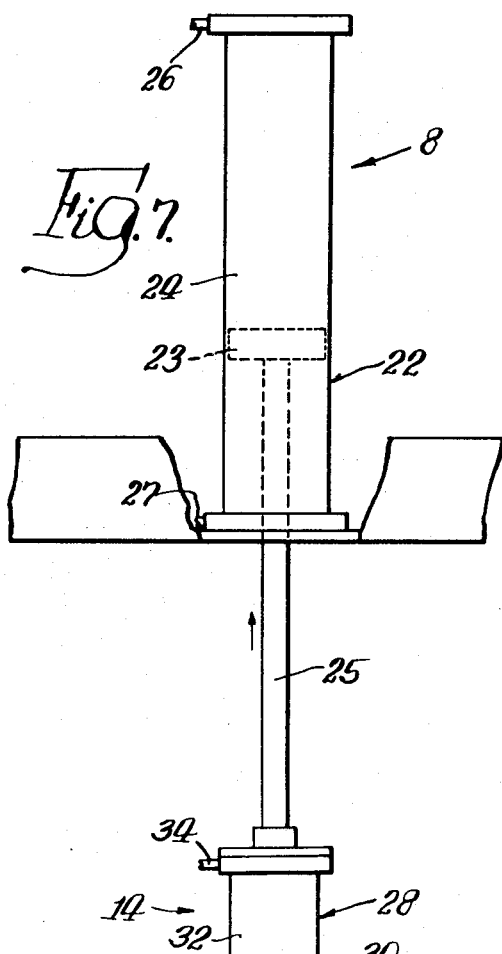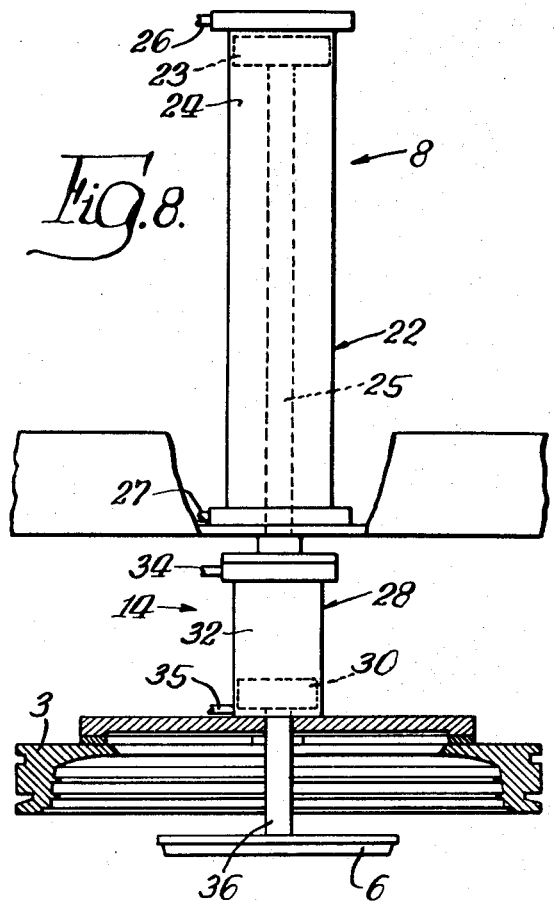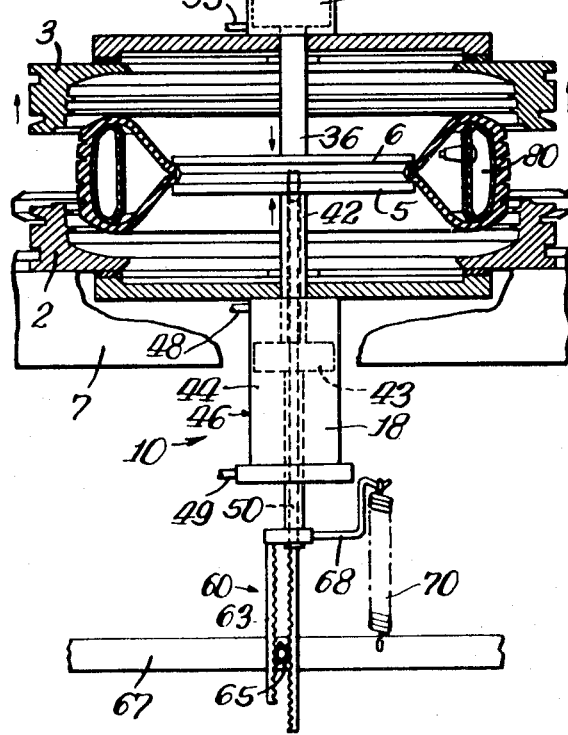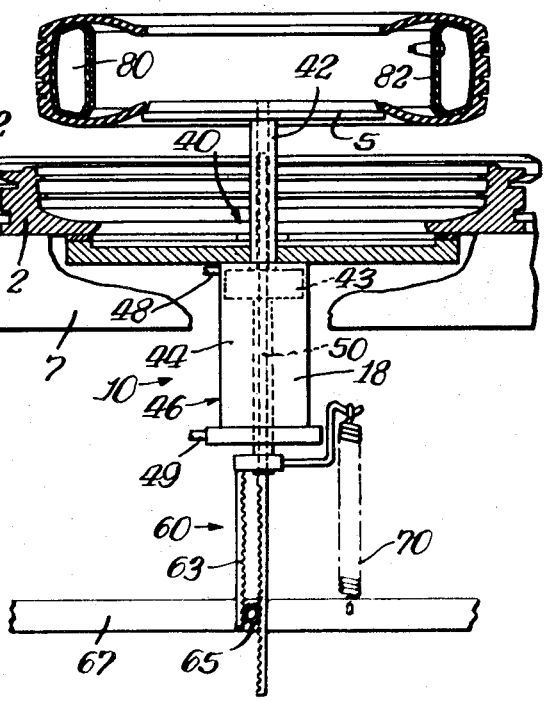

METHOD OF CENTERING TIRE CARCASS IN MOLD

This is a divisional application of Vaughn Rawls' application Ser. No. 702,224, filed Feb. 1, 1968, now U.S. Pat. No. 3,590,433.

BACKGROUND OF THE INVENTION

In applying a tire tread to a tire carcass as, for example, in retreading a tire from which a worn tread has been removed as by buffing, it is common practice to apply new tread material to the buffed carcass and then insert the carcass with the newly applied tread material between a pair of matching tire vulcanizing molds formed with desired tread matrices for displacement of the tread material into the matrices of the molds and to vulcanize the applied tire tread material. In prior art devices of the category noted an air bag and curing rim are assembled in known manner within the tire carcass and after placing such assembly between the molds and closing of the molds, air under pressure is admitted into the air bag to displace the tread material into the matrices of the molds.

In the known prior art devices, considerable difficulty is encountered in positioning and maintaining the tire tread material in centered relation with respect to the carcass and tire beads with the result that the tire tread is not truly centered on the tire carcass so that the resulting tire is not in good balance. It has been discovered that one reason for this difficulty is that the body of the tire carcass is too flexible during the centering operation.

SUMMARY OF THE INVENTION

This invention solves the flexibility problem during the centering operation by inflating the air bag contained in the tire carcass prior to placing the tire carcass in the mold. This pre-inflation step imparts sufficient rigidity to the tire carcass to enable it to be centered in the tire mold by a unique centering device which is disclosed and claimed in my above-identified co-pending application.

DESCRIPTION OF DRAWINGS:

FIG. 1 is a side elevational view of a tire molding machine constructed in accordance with the principles of the present invention with the tire molds in open position and a tire carcass supported on a lower bead guide at the commencement of a tire forming and vulcanizing operation; and FIGS. 2 through 8 are side elevational views of the machine of FIG. 1 showing the sequence and relative positions of the several components of the machine in molding and vulcanizing a tire.

DESCRIPTION OF PREFERRED EMBODIMENT

Figure 6:
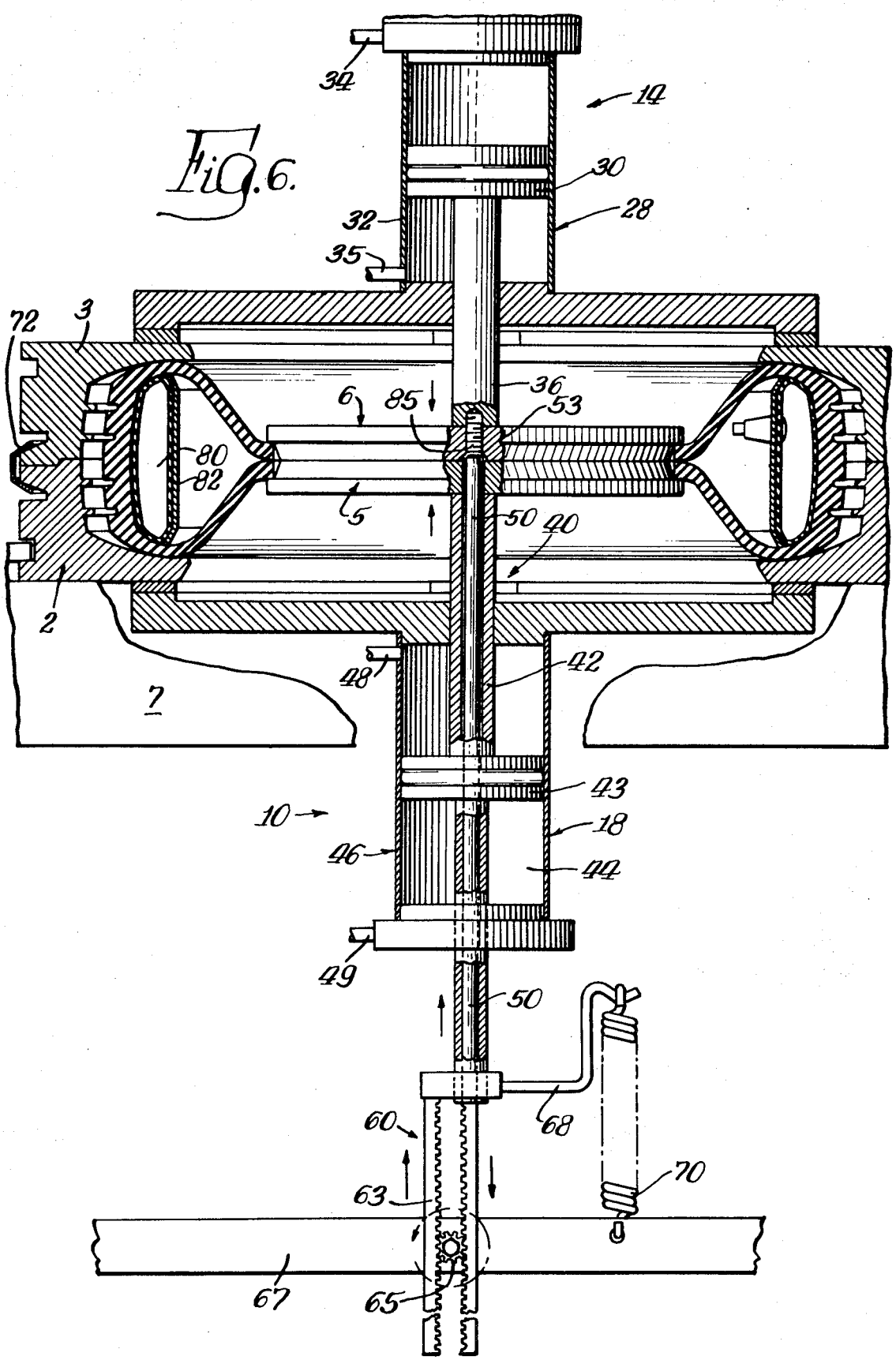

Referring now to FIG. 1, there is shown a tire molding machine constructed in accordance with the present invention which comprises a main supporting frame at 1, a first or lower tire mold section 2, and a second or upper tire mold section 3. A first or lower tire bead guide, as indicated generally by the reference numeral 5, is associated with the lower tire mold section 2, and a second or upper tire bead guide, as at 6, is associated with the upper tire mold section 3. The lower tire mold section 2 is supported on an intermediate frame member 7 of the main frame 1.

Mold positioning means, shown at 8, is supported at the upper end of the main frame 1 and provides for movement of the upper mold section 3 toward and away from the lower mold section 2 to thus provide for opening and closing of the mold cavity formed by the upper and lower tire mold sections 2 and 3.

Motion transmitting means, indicated generally at 10 is positioned in the main beneath the lower mold section 2 and provides for movement of the upper and lower tire bead guides 5 and 6 toward and away from each other when the tire bead guides are in engagement with the tire beads of a tire being molded and formed in the molding apparatus.

First or upper tire bead guide positioning means 14 is associated with mold positioning means 8, and provides for movement of the upper tire bead guide 6 relative to the upper mold section 3. Second or lower tire bead guide positioning means 18 is associated with motion transmitting means 10 and provides for movement of the lower tire bead guide 5 relative to the lower mold section 2.

In the general organization of components as above described it will be noted that the lower tire mold section 2 is of cup-shaped configuration with the open end thereof extending horizontally and opening upwardly. The lower mold section 2 is retained in stationary position upon an intermediate frame member 7 by a flanged retaining ring 20 holding the lower mold in a fixed position. In the embodiment of the invention shown, the upper mold section 3 is also of cup-shaped configuration with its open end extending horizontally and opposing the open end of the lower mold section 2 so that when the upper mold section 3 is brought to closed position with respect to the lower mold section 2, the inner faces of the mold sections 2 and 3 define a tire receiving chamber with the inner faces of the tire molds at the outer peripheries thereof having tire tread matrices of desired pattern for displacement of tire tread material thereinto in securing and vulcanizing a desired tread to the periphery of a carcass of a tire.

The aforementioned mold positioning means 8 may, for example, be defined by a first double fluid actuated piston and cylinder assembly 22 comprising a first piston 23 mounted for reciprocation in a first cylinder 24. The piston and cylinder assembly 22 includes fluid connections, as at 26 and 27, providing for reciprocation of piston 23, in known manner, in one direction or the other depending upon which of the fluid connections are under pressure or bleed.

The first bead guide positioning means 14 comprises a second double fluid actuated hydraulic piston assembly 28 having a second piston 30 mounted for reciprocatory movement in a second cylinder 32 with the second cylinder 32 being connected at its closed upper end with the lower of piston rod 25 which at its upper end is securely connected to the first piston 23 of the first piston and cylinder assembly 22. The second piston and cylinder assembly 28 is provided with fluid connections 34 and 35 at opposite ends of the second cylinder 32 to provide for movement of the upper bead guide 6, which as shown, is mounted at the outer end of a piston rod 36 having connection at its other end with the second piston 30. The second piston 30 and the upper bead guide 6 may then be reciprocated relative to upper mold 3 depending upon which of the fluid connections are under pressure or bleed.

The aforementioned motion transmitting means 10 further comprises centering means, indicated generally at 40, which as shown comprises a hollow cylindrical tube 42 connected at its upper end to the lower bead guide 5 and intermediate its ends to a third piston 43 of a third double fluid actuated piston and cylinder assembly 44. The third piston and cylinder assembly comprises a third cylinder 46 within which the third piston 43 is mounted for reciprocation by the selective admission and establishing of bleed through fluid connections 48 and 49 at the upper and lower ends of third cylinder 46. Movement of the third piston 43 in the third cylinder 46 by the selective admission and establishment of bleed at opposite sides of the third piston 43 provides for the raising and lowering of the lower bead guide 5 relative to the lower tire mold section 2. A centering rod 50 projects through the hollow rod 42 and the upper outer end of rod 50, which as will presently appear, is adapted to have engagement with a centrally located socket means 53 formed in the upper bead guide 6.

The motion transmitting means 10 further comprises drive means 60 disposed below the third piston and cylinder assembly 44 and, as shown, comprises a toothed rack 63 secured at its upper end to the lower end of the hollow tube 42. A pinion 65 is mounted for rotation on a fixed axis on a lower frame member 67 of the frame 1 for meshing engagement with the toothed rack 63 and with the toothed lower end portion of the centering rod 50 for purposes hereinafter described. A tension spring 70 is anchored at one end to the frame member 67 and at its other end is connected to a bracket 68 fixedly mounted to the upper end of the rack 63 which as before noted is secured to the lower end of the hollow rod 42.

It will be noted that the several foregoing components including the first piston and cylinder assembly 22, the second piston and cylinder assembly 14, the third piston and cylinder assembly 44, the lower and upper tire bead guides 5 and 6, respectively, and the lower and upper tire mold sections 2 and 3, respectively are arranged on a common vertical axis.

In the position of the parts, as shown in FIG. 1, it will be noted that the first piston and cylinder assembly 22 has been energized to position the upper tire mold section 3 in open or spaced away relation with respect to the lower tire mold section 2, and that the second piston and cylinder assembly 14 is energized to dispose the upper bead guide 6 in a position projecting well outwardly of the open end of the upper tire mold section 3. The third piston and cylinder assembly 44 is energized to dispose the hollow rod 42 and the lower bead guide 5 carried thereby well above the open end of the lower mold section 2 for receiving thereon a tire carcass to which thread material has been applied and which tread material it is desired to mold to the tire carcass and provide such tread material with the tread pattern of the matrices of the upper and lower molds. As seen in FIG. 1, one of the tire beads of the tire carcass rests upon a suitably formed beveled annular shoulder of the lower tire bead guide 5 supporting the tire carcass in a horizontal plane with its rotational axis on the aforementioned common axis of the several components of the machine. The upper tire bead guide 6 is also provided with an annular beveled shoulder for cooperation with the other or opposite tire bead of the tire as will presently appear. The tire carcass, in accordance with conventional practice, has an air bag 80 and curing rim 82 assembled therein.

One important step in practicing the present invention is to charge the air bag 80 with air under pressure to impart rigidity to the tire carcass. It has been found that the pre-inflation step is quite necessary to enable the tire carcass to be properly centered in the tire mold.

Referring now to FIG. 2, it will be seen that the upper tire mold 3 has been advanced toward the lower tire mold 2 to begin the tire molding and vulcanizing operation. In the illustrated position of the parts the mold positioning means 8 has been suitably energized to lower the upper mold 3, and the second or lower tire bead positioning means 44 has been appropriately energized to retract the lower bead guide 5 toward and partially into the lower tire mold 2. The mold positioning means 8 when energized to assume the position shown in FIG. 2 engages the upper tire bead guide 6 with the upwardly disposed tire bead of the tire carcass. The hollow control rod 42 is also moving downwardly and through drive means 60 has raised the centering rod 50 to engage the upper end thereof with the socket 53 formed centrally of the upper tire bead guide 6 whereby motion transmitting means effects movement of the upper and lower tire bead guides 5 and 6 conjointly and in uniform amount with respect to each other to retain the tire beads symmetrical with respect to a horizontal axis of the tire, as indicated by the line A—A, to maintain the tire beads in true centered relation with respect to the tire carcass. The engaging of the upper and lower tire bead guides with the tire beads distorts the cross section of the tire carcass to reduce the outside diameter of the tire carcass so that the tire tread material clears the tread matrices at the inner faces of the upper and lower tire molds.

The next succeeding positions of the parts is shown in FIG 3, from which it will be seen that the mold positioning means 8, the upper tire bead guide positioning means 14, and the lower tire bead guide positioning means 44 have been energized to provide for closing of the mold by disposition of the upper mold part upon the lower tire mold and again the upper and lower tire bead guides are retained in centered relation at the mold parting line by action of the centering rod 50 on the socket means in the upper bead guide 6 through actuation of the aforedescribed drive means 60. With the parts in the last noted position, known conventional clamping ring means 72 is applied at the adjoining central portions of the upper and lower tire molds to securely clamp the tire molds together.

As next seen in FIG. 4, the tire bead guides 5 and 6 are retracting uniformly and conjointly with respect to each other permitting the outside diameter of the tire to increase, and in the illustrated position of the parts it will be seen that the tension spring 70 maintains the upper end of the centering rod 50 in contact with the socket means 53 in the upper bead guide 6 to thus assure symmetry of separation of the tire bead guides 5 and 6 and axial separation of the tire beads of the carcass.

When the tire bead guides 5 and 6 reach the positions shown in FIG. 5 and are no longer in contact with the tire beads air under suitable pressure in air bag 80 effects displacement of tire tread material into the tread matrices of the upper and lower molds 2 and 3. Also, the upper and lower molds are heated in a conventional manner to vulcanize or cure the tire tread material applied to the tire carcass. The parts are retained in this position for a suitable length of time to effect satisfactory curing of vulcanizing of the tire tread material. Preferably the aforementioned clamp 72 and the means for effecting admission of air under pressure to the air bag are interlocked to prevent inflation of the air bag when the clamp is unlocked.

After curing of the tire as described in connection with FIG. 5 the air bag 80, as shown in FIG. 6, is exhausted and the upper and lower bead guides 5 and 6 are conjointly and uniformly moved toward each other to positions in which they engage the tire beads through the mechanisms afore-described to reduce the outside diameter of the tire to permit separation of the upper and lower tire molds for withdrawal of the tire.

After removal of clamp ring means 72 the several aforedescribed parts are then moved to the positions shown in FIG. 7 in which the mold positioning means 8 is being energized to effect movement of the upper tire mold 3 away from the lower tire mold 2, and the upper bead guide positioning means 14 and the lower bead guide positioning means 44 are being suitably energized and, under which conditions, the upper bead guide positioning means has been fully extended, and the lower bead guide positioning means is being extended to maintain distortion of the tire so that its outside diameter clears the tread matrices of the upper and lower molds.

Thereafter the mold positioning means 8 and the lower tire bead guide positioning means 44 are energized to restore the several parts of the machine to the positions thereof shown in FIG. 1. The finished tire is thus supported on the lower bead guide 5 well above the open end of the lower tire mold in position from which it may be readily moved by the operator of the machine.

Of particular importance, reference again may be made to FIG 4 from which it will be observed that the tension spring 70 applies a biasing force to the hollow tube 42 and through the drive means 60 assures maintaining the outer upper end of the centering rod in contact with the socket of the upper tire bead guide to assure symmetry of separation of the tire bead guides. The tension spring 70, as seen in FIG. 4, assures an imbalance between the piston and cylinder assemblies of the upper and lower bead guide positioning means 14 and 44, respectively, so that the piston and cylinder assembly of lower bead guide positioning means 44 responds preferentially to start the releasing of the tire beads in the same direction.

A further feature of advantage is the utilization of an adjustment screw 85 for the socket 53 of the upper bead guide to adjust the depth of the socket means and thus provide for a desired relationship of the centering means 40 for the upper and lower bead guides in relation to the tire beads of a tire.

While a preferred embodiment of the invention has been shown and described, it will be understood that various modifications and rearrangements may be made therein without departing from the spirit and scope of the invention.

The invention claimed is:
1. The method of installing a tire carcass having a tire tread material on its outer periphery into a tire mold, comprising the steps of:
   placing an air bag and curing rim in said tire carcass,
   inflating said air bag to impart rigidity to said tire carcass,
   drawing and holding the tire beads of said tire carcass together to reduce the outside diameter of said tire carcass,
   enclosing said tire carcass in a centered relation in a tire mold having tread matrices, and
   releasing the tire beads to allow said tire tread material to be displaced into said tread matrices.
2. The method as defined in claim 1, wherein said step of drawing and holding the tire beads together comprises:
   engaging said tire beads between a pair of tire bead guides, and
   drawing said tire bead guides together to reduce the outside diameter of said tire carcass, and wherein said step of enclosing said tire carcass into a tire mold comprises:
   lowering said bead guides carrying said tire carcass into a lower mold section, and lowering an upper mold section onto the top of said lower mold section to form a complete mold cavity.
3. The method of installing a tire carcass having a tire tread material on its outer periphery in a tire mold, comprising the steps of:
   inflating an air bag in said tire carcass to impart rigidity to said tire carcass,
   engaging the beads of said tire carcass between a pair of bead guides,
   drawing said bead guides together to reduce the diameter of said tire carcass,
   lowering said bead guides and tire carcass into a lower mold,
   lowering an upper mold onto the top of said lower mold to form a complete mold cavity, and
   retracting said bead guides away from each other to allow said tire tread material to be displaced into the tread matrices of said mold cavity.

* * * * *